(12) United States Patent
Huang et al.

(10) Patent No.: US 10,761,963 B2
(45) Date of Patent: *Sep. 1, 2020

(54) OBJECT MONITORING IN CODE DEBUGGING

(71) Applicant: International Business Machines Corporation, Armonk, NY (US)

(72) Inventors: Ji Yong Huang, Beijing (CN); Bin Bin Li, Ningbo (CN); Lin Lu, Ningbo (CN); Jun Zhou, Ningbo (CN)

(73) Assignee: International Business Machines Corporation, Armonk, NY (US)

(*) Notice: Subject to any disclaimer, the term of this patent is extended or adjusted under 35 U.S.C. 154(b) by 187 days.

This patent is subject to a terminal disclaimer.

(21) Appl. No.: 15/446,398

(22) Filed: Mar. 1, 2017

(65) Prior Publication Data

US 2017/0168916 A1 Jun. 15, 2017

Related U.S. Application Data

(63) Continuation of application No. 14/939,249, filed on Nov. 12, 2015, now Pat. No. 9,619,366.

(51) Int. Cl.
*G06F 11/36* (2006.01)
*G06F 11/34* (2006.01)

(52) U.S. Cl.
CPC ...... *G06F 11/3636* (2013.01); *G06F 11/3466* (2013.01); *G06F 11/362* (2013.01); *G06F 11/364* (2013.01); *G06F 11/3644* (2013.01); *G06F 11/3664* (2013.01)

(58) Field of Classification Search
CPC ............ G06F 11/3636; G06F 11/3466; G06F 11/362; G06F 11/364; G06F 11/3644; G06F 11/3664
See application file for complete search history.

(56) References Cited

U.S. PATENT DOCUMENTS

| 6,434,681 | B1 | 8/2002 | Armangau |
| 6,678,884 | B1 | 1/2004 | Kesselman et al. |
| 6,892,325 | B2 | 5/2005 | Bates et al. |
| 6,901,581 | B1* | 5/2005 | Schneider ........... G06F 11/3636 714/E11.212 |
| 7,577,942 | B2 | 8/2009 | Bates et al. |
| 7,739,664 | B2 | 6/2010 | Bates et al. |
| 9,021,087 | B1* | 4/2015 | Weng .................. H04L 67/1095 709/213 |

(Continued)

OTHER PUBLICATIONS

Huang et al., "Object Monitoring in Code Debugging", U.S. Appl. No. 15/447,156, filed Mar. 2, 2017, 25 pages.

(Continued)

*Primary Examiner* — Viva Miller
(74) *Attorney, Agent, or Firm* — Andrew Aubert

(57) ABSTRACT

According to example embodiments of the present invention, an object to be monitored is determined, the object being associated with a variable in a code snippet including a plurality of statements. The object is monitored in execution of the plurality of statements. If a plurality of updates of the object are detected in the execution of the plurality of statements, a snapshot associated with each of the updates of the object is created. The snapshot includes a current value of the object and a memory address for the current value of the object.

16 Claims, 9 Drawing Sheets

(56) References Cited

U.S. PATENT DOCUMENTS

| | | | | |
|---|---|---|---|---|
| 9,400,816 B1* | 7/2016 | Gubarev | ............ | G06F 16/2474 |
| 9,659,038 B2* | 5/2017 | Saito | ........................ | G06F 16/21 |
| 2002/0087950 A1* | 7/2002 | Brodeur | ............ | G06F 11/3636 717/124 |
| 2002/0174416 A1* | 11/2002 | Bates | ................. | G06F 11/3636 717/128 |
| 2003/0023955 A1* | 1/2003 | Bates | ................. | G06F 11/3664 717/129 |
| 2003/0101379 A1* | 5/2003 | Bates | ................. | G06F 11/3664 714/38.1 |
| 2012/0089577 A1* | 4/2012 | Beier | ................. | G06F 16/2477 707/687 |
| 2013/0036403 A1 | 2/2013 | Geist | | |
| 2013/0227530 A1 | 8/2013 | Zhang et al. | | |
| 2015/0277993 A1* | 10/2015 | Gu | ........................... | G06F 9/52 718/102 |
| 2016/0357519 A1* | 12/2016 | Vargas | ................... | G06F 9/451 |

OTHER PUBLICATIONS

List of IBM Patents and Patent Applications Treated as Related, Filed Mar. 2, 2017, 2 pages.

Huang et al., "Object Monitoring in Code Debugging", U.S. Appl. No. 14/939,249, filed Nov. 12, 2015, 28 pages.

Huang et al., "Object Monitoring in Code Debugging", U.S. Appl. No. 15/097,350, filed Apr. 13, 2016, 25 pages.

Mancier, Patrick, "Debugging C++ Using Visual Studio 2005/2008, Part 3: Using Breakpoints Effectively", Printed on: Aug. 24, 2015, pp. 1-5, <http://www.cprogramming.com/tutorial/visual_studio_breakpoints.html>.

"Using Profiling Points in NetBeans IDE", Printed on: Aug. 24, 2015, pp. 1-8, <https://netbeans.org/kb/docs/java/profiler-profilingpoints.html?print=yes>.

* cited by examiner

```
 92    public Connection getConnection(){
 93        String driver = "com.ibm.db2.jcc.DB2Driver";
 94        String url = "jdbc:db2://localhost:50000/RAN7521";
 95        String user = "userid";
 96        String pw = "password";
 97        Connection conn = null;
 98        PreparedStatement pstmt = null;
 99
100        try {
101            Class.forName(driver).newInstance();
102            conn = DriverManager.getConnection(url, user, pw);
103            conn.setTransactionIsolation(Connection.TRANSACTION_READ_COMMITTED);
104            conn.setAutoCommit(false);
105            pstmt = conn.prepareStatement(FLAG_QUERY);
106            pstmt.setString(1, "361EDA83-3DCA-A29C-C95E-7DC903ECA0D4");
107            pstmt.setString(2, "7.0");
108            ResultSet rs = pstmt.executeQuery();
109            while(rs.next()){
110                int rc = rs.getInt(1);
111            }
112
113            pstmt.close();
114
115        } catch (Exception e){
116            e.printStackTrace();
117        }
118
119        return conn;
120    }
```

OBJECT MONITORING IN CODE DEBUGGING

BACKGROUND

Debugging is a process of finding and removing bugs or defects in a computer program in order to make the program behave as expected. Debugging involves numerous aspects, including, but not limited to, interactive debugging, control flow, integration testing, log files, monitoring (application or system), memory dumps, profiling, statistical process control, and special design tactics to improve detection while simplifying changes. Debugging is often performed by means of software tools called "debuggers." A debugger may be provided by an integrated development environment (IDE).

The debuggers enable the programmer to debug the program in a variety of ways. For example, the programmer may use the debugger to start, monitor or end the execution of the program, set breakpoints, change values in memory, and so on. Conventionally the debugger allows the programmer to use a step or single-step mode to go through code lines one by one to check values of monitored objects. The monitored objects include, for example, variables of interest in the program or user defined expressions in the debugger. Another commonly-used functionality provided by the debugger is breakpoint. During execution of a code segment, the debugger can stop execution of the program at any code line where a breakpoint is set. Then the programmer may, for example, check the execution results for analysis purposes.

SUMMARY

According to an aspect of the present invention, there is a method that performs the following operations (not necessarily in the following order): (i) determining an object to be monitored, the object being associated with a variable in a code snippet, the code snippet including a plurality of statements; (ii) monitoring the object during execution of the plurality of statements to detect to a set of updates made to the object during the execution of the plurality of statements; and (iii) creating a snapshot respectively associated with each of the updates of the object, with each snapshot including a current value of the object and a memory address for the current value of the object.

According to an aspect of the present invention, there is a system that performs the following operations (not necessarily in the following order): (i) determining an object to be monitored, the object being associated with a variable in a code snippet, the code snippet including a plurality of statements; (ii) monitoring the object during execution of the plurality of statements to detect to a set of updates made to the object during the execution of the plurality of statements; and (iii) creating a snapshot respectively associated with each of the updates of the object, with each snapshot including a current value of the object and a memory address for the current value of the object.

According to an aspect of the present invention, there is a computer program product that performs the following operations (not necessarily in the following order): (i) determine an object to be monitored, the object being associated with a variable in a code snippet, the code snippet including a plurality of statements; (ii) monitor the object during execution of the plurality of statements to detect to a set of updates made to the object during the execution of the plurality of statements; and (iii) create a snapshot respectively associated with each of the updates of the object, with each snapshot including a current value of the object and a memory address for the current value of the object.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 3 is an example of a code snippet selected from a code segment in accordance with embodiments of the present invention;

Figure 1:
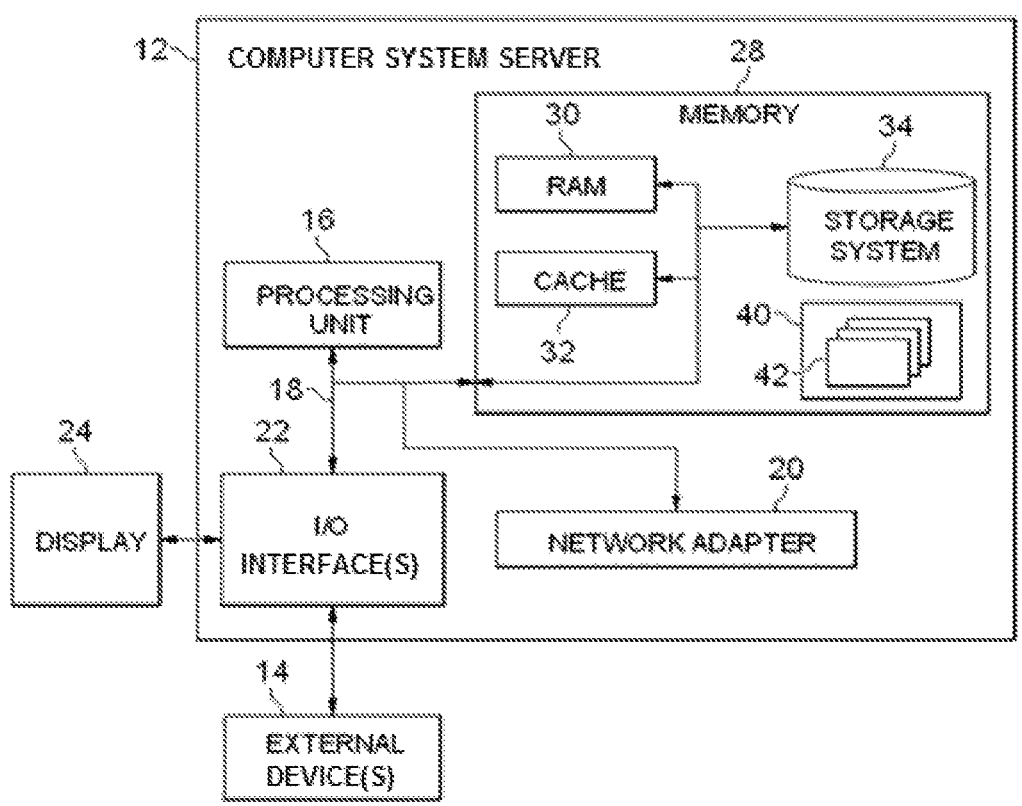
FIG. 1 is a block diagram of an electronic device in which embodiments of the present invention can be implemented.

Throughout the drawings, the same, or similar, reference numerals represent the same, or similar, element.

DETAILED DESCRIPTION

In general, example embodiments of the present invention include a method, system and computer program product for monitoring variables in code debugging.

According to one embodiment of the present invention, there is provided a computer-implemented method. The method comprises determining an object to be monitored, the object being associated with a variable in a code snippet. The code snippet includes a plurality of statements. The method also comprises monitoring the object in execution of the plurality of statements. The method further comprises creating, in response to detecting a plurality of updates of the object in the execution of the plurality of statements, a snapshot associated with each of the updates of the object. The snapshot includes a current value of the object and a memory address for the current value of the object.

According to another embodiment of the present invention, there is provided a system. The system comprises one or more processors and a memory coupled to at least one of the processors. The system further comprises a set of computer program instructions stored in the memory and executed by at least one of the processors in order to perform actions. The actions comprise determining an object to be monitored, the object being associated with a variable in a code snippet. The code snippet includes a plurality of statements. The actions also comprise monitoring the object in execution of the plurality of statements. The actions further comprise creating, in response to detecting a plurality of updates of the object in the execution of the plurality of statements, a snapshot associated with each of the updates of the object. The snapshot includes a current value of the object and a memory address for the current value of the object.

According to yet another embodiment of the present invention, there is provided a computer program product. The computer program product comprises a computer readable storage medium having program instructions embodied therewith. The program instructions are executable by a device to cause the device to determine an object to be monitored, the object being associated with a variable in a code snippet. The code snippet includes a plurality of statements. The program instructions also cause the device to monitor the object in execution of the plurality of statements. The program instructions further cause the device to create, in response to detecting a plurality of updates of the object in the execution of the plurality of statements, a snapshot associated with each of the updates of the object. The snapshot includes a current value of the object and a memory address for the current value of the object.

It is to be understood that the foregoing examples are not intended to identify key or essential features of embodiments of the present invention, nor is it intended to be used to limit the scope of the present invention. Other features of various embodiments of the present invention will be described below.

Principles relating to some embodiments of the present disclosure will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Reference is first made to FIG. 1, in which an electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (for example, network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of independent disks) systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

As described above, conventional debuggers allow a programmer to use a single-step mode and/or breakpoint to debug the program. In the single-step mode, the execution of program stops after each statement, such that the programmer can check the value of a monitored object such as a variable in the program or an expression in the debugger. Or, alternatively, the programmer may set a breakpoint at a code line where he/she wants to check the object value. The execution of the program will stop once the breakpoint is reached. However, at present, it is difficult to identify a change flow of the variable or expression in execution of a given code snippet. That is, given a piece of code consisting of a series of statements, the debugging process cannot identify the change procedure of the monitored variable or expression among these statements. The programmer has to manually identify where the variable value or the expression value might be changed and set the breakpoints accordingly.

Embodiments of the present invention deal with the above problem by tracking and recording the change flow of a monitored object during the execution of the program. Within a given code snippet, the debugging process creates a snapshot for the monitored object each time its value changes. The snapshot at least records a current value of the object and a memory address for the value of the object. In this way, after the execution of the code snippet, all updates of the object can be presented such that the programmer can easily identify the change flow of the object. In embodiments of the present invention, the monitored object may include a variable in the code snippet and/or an expression being inputted in a debugger for debugging the code snippet. Monitoring updates of a variable and of an expression will be described in more detail with the following particular description of FIG. 2 and FIG. 6, respectively.

Figure 2:
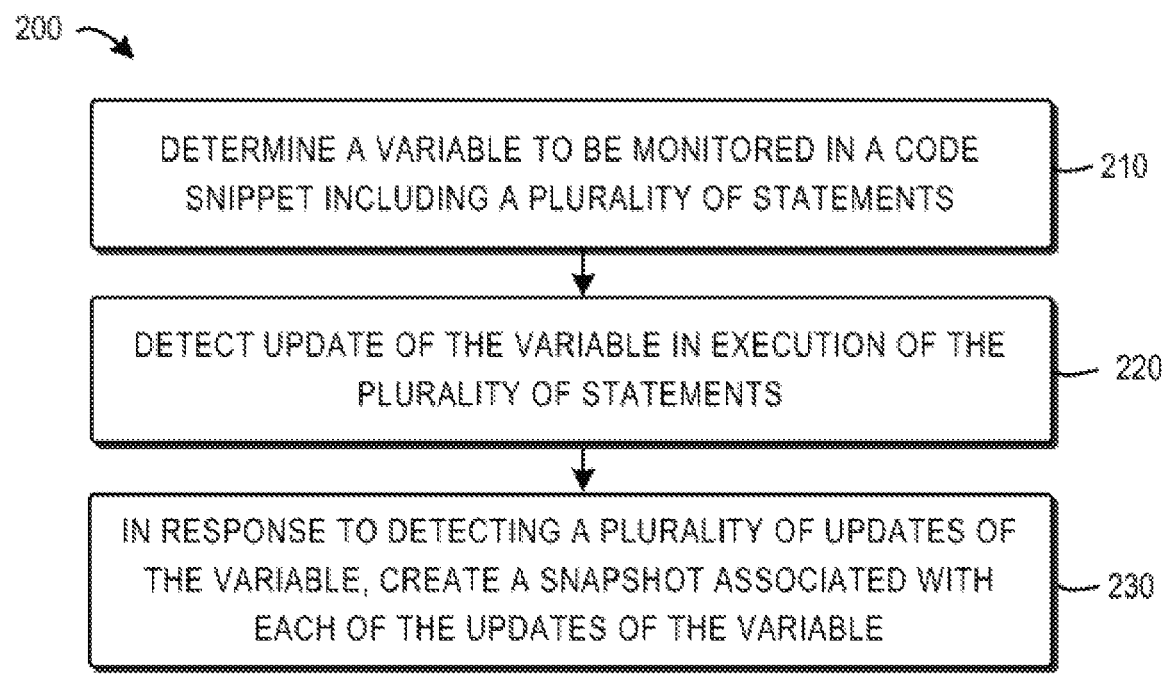
FIG. 2 is a flowchart of a method for monitoring updates of a variable in accordance with embodiments of the present invention.

Reference is now made to FIG. 2, which depicts a flowchart of a method 200 for monitoring updates of a variable in accordance with embodiments of the present invention. As shown, the method 200 is entered in step 210, where a variable to be monitored in a code snippet is determined. The code snippet is a piece of code in the code segment including a plurality of statements. In execution, some statements may change the values of one or more variables and/or the memory addresses thereof. FIG. 3 shows an example code segment 300. A code snippet 310 in the code segment 300 is a piece of code that is expected to be debugged to monitor changes of some variables included therein.

In some embodiments, the code snippet may be specified by a user from the code segment. For example, the user may specify two monitor points at two code lines of the code segment. The statements between the two monitor points may be determined as a code snippet. The line numbers associated with the specified two monitor points may be used to identify the code snippet. In the example of FIG. 3, two monitor points 321 and 322 are set at code lines 101 and 113. Thus the statements between the monitor points 321 and 322 constitute the code snippet 310. In some cases where the code segment is written in an object-oriented programming language, the code segment may have multiple classes and class member functions. The class name and/or function name associated may be used to identify the code snippet from the code segment.

In some embodiments, the user may expressly specify the variable to be monitored. For example, the user may input the name of the variable. Alternatively, or in addition, the user may select the variable using a pointing device like a mouse and mark the variable as the monitoring target. For example, as shown in FIG. 3, a variable "conn" 331 may be selected by the user as a variable to be monitored. Alternatively, or in addition, the code snippet may be parsed automatically to identify all variables included in the code snippet. Semantic analysis or any other suitable approaches may be employed to collect the variables from the code snippet. If multiple variables are identified, the variables may be presented to the user, for example, in a list. The user may then select the variable to be monitored from among these variables. Alternatively, all the identified variables may be monitored in some examples. It is to be understood that though only one variable 331 is selected in the example of FIG. 3, the scope of the invention is not limited thereto. It is possible to select any number of variables to be monitored.

Updates of a variable are monitored in steps 220 and 230. Particularly, in step 220, update of the variable in execution of the plurality of statements is detected. To this end, the statements in the code snippet are executed by the debugger. It would be appreciated that one or more statements, when being executed, may modify the value of the variable. As used herein, the value of a variable may be an integer, a float, a string, a character or the like, depending on the type of the variable. Alternatively, or in addition, the memory address for the value of the variable might be changed by one or more statements. The update of the memory address indicates that the current value of the variable is directed to a new memory address. In this event, the variable value may or may not change.

In order to detect whether the value and/or the memory address is updated, at the beginning of the code snippet, for example, at the first of the two monitor points specified in the code segment, an initial value of the variable and an initial memory address for the value are recorded. In execution of each statement of the code snippet, the current value of the variable may be compared with the previous value to detect if the two values are different. For example, in execution of the first statement of the code snippet, the current value of the variable is compared with the initial value. If the value is updated, in execution of next statement, the value of the variable collected now may be compared with the previously updated value to check if the variable is updated again. A checksum algorithm may be employed to determine whether checksums of the two values match or not. If the checksums of the two values do not match, it is determined that the variable is updated. Likewise, the memory address for the value of the variable collected in execution of the current statement and a previous memory address are compared. For example, checksums of the two memory addresses may be calculated to detect the update of the variable.

Next, in step 230, in response to detecting a plurality of updates of the variable, a snapshot associated with each update of the variable is created. That is, if it is detected in step 220 that the variable to be monitored is given a new value, and/or the value of the variable is directed to a new memory address in execution of a statement, a new snapshot is created for the update of the variable. In this way, after execution of the statements of the code snippet, if a plurality of updates of the variable are detected, multiple snapshots are created for the respective updates.

A snapshot at least includes a value of the variable and a memory address for the value of the variable. In some embodiments, the snapshot can be created in an incremental way. That is, if only the value of the variable is changed, the updated value is recorded and the memory address remains unchanged in the newly created snapshot. Likewise, if only the memory address is changed, the previous value and the updated memory address are recorded in the new snapshot. If the value of the variable and the memory address for the value are both detected to be updated, then the created snapshot may include the updated value and the updated memory address for the updated value.

In some embodiments, the snapshots created for the detected multiple updates of the variable may be presented to the programmer, so that the programmer can check the flow of continuous changes in the variable. The programmer can easily determine whether the value or memory address of the variable is updated as desired. In this way, the code debugging process provides the programmer with a more powerful mechanism for variable monitoring and tracking.

In addition to the value and the memory address, the snapshot may further include context of the variable. As used herein, the context refers to the information that indicates the environment or condition at the time when the update of the variable is detected. In one embodiment, the context of the variable may include a statement where the update of the variable is detected. That is, if the variable is updated in execution of a particular statement, this statement is recorded in the snapshot for the updated variable. By means of such information, the programmer may identify where the variable is updated by checking the context of the snapshot. The statement can be represented by its line number(s), for example.

In some instances, the location of the statement cannot uniquely identify a plurality of snapshots created for updates of the variable. For example, a variable may be included in a loop function of the code snippet and its value may be updated in execution of a particular statement included in the loop. In this case, a new snapshot will be created each time through the loop. However, the location of the particular statement where update of the variable is detected may remain the same in each snapshot. In order to differentiate the plurality of snapshots, in one embodiment, the context may include a timestamp for each snapshot to indicate when the update of the variable is detected. As such, even if the variable is updated in the same statement for several times, the user can differentiate the snapshots based on the timestamps.

Alternatively, or in addition, a statement containing a declaration of the variable may be recorded in a snapshot as the context of the variable. In one example, the location of the declaration, for example, in the form of a line number may be included in the context. As known, different variables may share the same variable name, for example, in different naming spaces. In order to avoid confusion in the snapshots, in creating a snapshot, the location of declaration of the variable may be included in the context of the snapshot.

Figure 4:
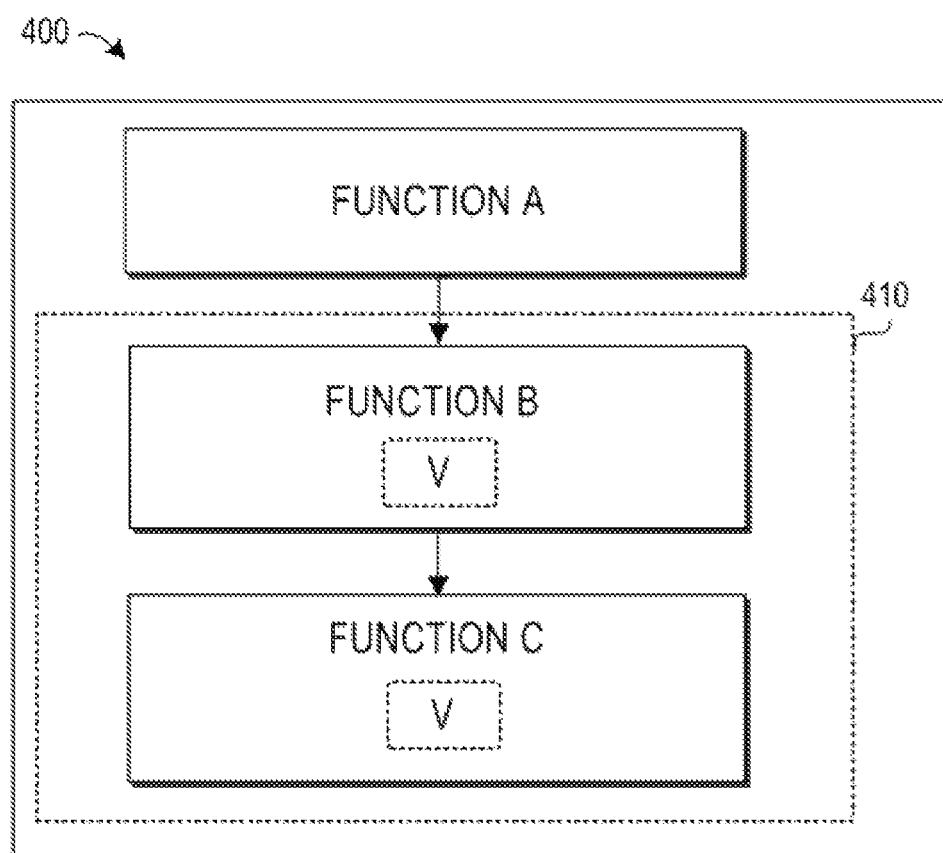
FIG. 4 is an example of a code segment presenting a relationship of function call of a variable in accordance with embodiments of the present invention.

Instead of or in addition to the above information, the context may include a stack status of the variable. As used herein, a "stack status" refers to the relationship of function calls related to the variable. The stack status may also be used to indicate the environment of the variable when update of the variable is detected. By way of example, as shown in FIG. 4, a code segment 400 has three functions A, B and C. In the code segment 400, the function A calls the function B, and the function B in turn calls the function C. The variable V to be monitored is declared in the function B. The function B and function C both include statements related to the variable V and the two functions are included in a code snippet 410 specified by a user. If update of the variable V is detected in the function C during execution of the code snippet 410, the relationship of function call related to the functions A, B and C may be recorded as a stack status and be included in a snapshot established in response to the update. After the function C returns, update of the variable V will be detected in the function B. At this point, the stack status of the variable V recorded in the new snapshot only indicates the function calls between the functions A and B. In this way, the user may determine the exact statement that changes the variable value.

Although some example information that can be included in the context of the variable are discussed above, it will be appreciated that any other suitable information that can be used to indicate the environment or conditions of the variable may also be collected and recorded in the context of the variable. For example, code debugging of a code snippet is generally performed in a computing environment. Conditions of the computing environment at the time a snapshot for a variable is recorded may be collected and included in the context of the variable. The conditions of the computing environment may include, but are not limited to, usage of the CPU and memory in the computing environment. With information such as usage of the CPU and memory included in a snapshot created for update of the variable, the user may detect effect of the update on consumption of resources of the computing environment.

In some embodiments, after the execution of the statements included in the code snippet completes, the created snapshots may be presented to the user. All the snapshots may be presented to the user in a sequence according to the time order. That is, the snapshots may be arranged in the sequence according to an order in which the corresponding updates are detected. The timestamps recorded in the snapshots may be used to determine the order of each of the snapshots. The snapshots may be displayed in any other suitable way as well. For example, in one embodiment, a curve may be presented to indicate the change flow of the variable values that are recorded in the snapshots. The contents included in the snapshots may also be displayed in a diagram or a table, for example.

Figure 5:
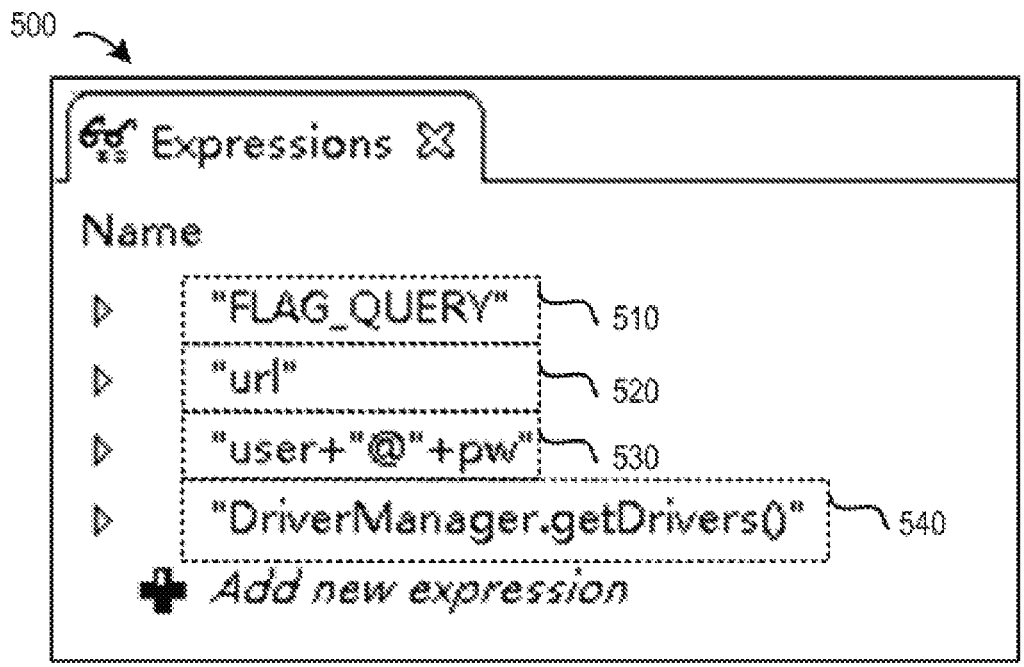
FIG. 5 is an example of a user interface of a debugger for inputting expressions in accordance with embodiments of the present invention.

Moreover, it is known that in code debugging, one or more expressions may be written into a debugger to assist the debugging of a code snippet. It is to be noted that although an expression may be partitioned from a code snippet to be debugged, in the context of this disclosure, an expression refers to the one written in the debugger. FIG. 5 shows an example user interface 500 of a debugger where the user can input expressions when debugging the code snippet 310. For example, in the user interface 500, four expressions 510 to 540 have been written in the debugger. An expression may include a single variable or function included in the code snippet or an operation between several variables or functions. For example, the expression 510 includes a variable "FLAG_QUERY" that is included in the code snippet 310 as a variable 335, and one variable "url" 332 in the code snippet 310 is included in the expression 520. The expression 530 defines an operation between two variables "user" and "pw", where two variables are both included in the code snippet 310 as variables 333 and 334. In addition, variables or functions that are not included in the code snippet may also be written into the debugger as expressions if the user wants to monitor how those variables or functions change during debugging of the code snippet. In the example of FIG. 5, the expression 540 defines a function "DriverManager.getDrivers( )" that is not included in the code snippet 310.

In execution of each statement of the code snippet, the expressions included in the debugger may also be executed to present corresponding values. However, similar to the variables of the code snippet, using a "step" mode and a "breakpoint" of conventional debuggers, only the current values of the expressions can be presented after a statement is executed or when a breakpoint is reached. It is difficult to identify change flows of the expressions in a series of statements of the code snippet.

Figure 6:
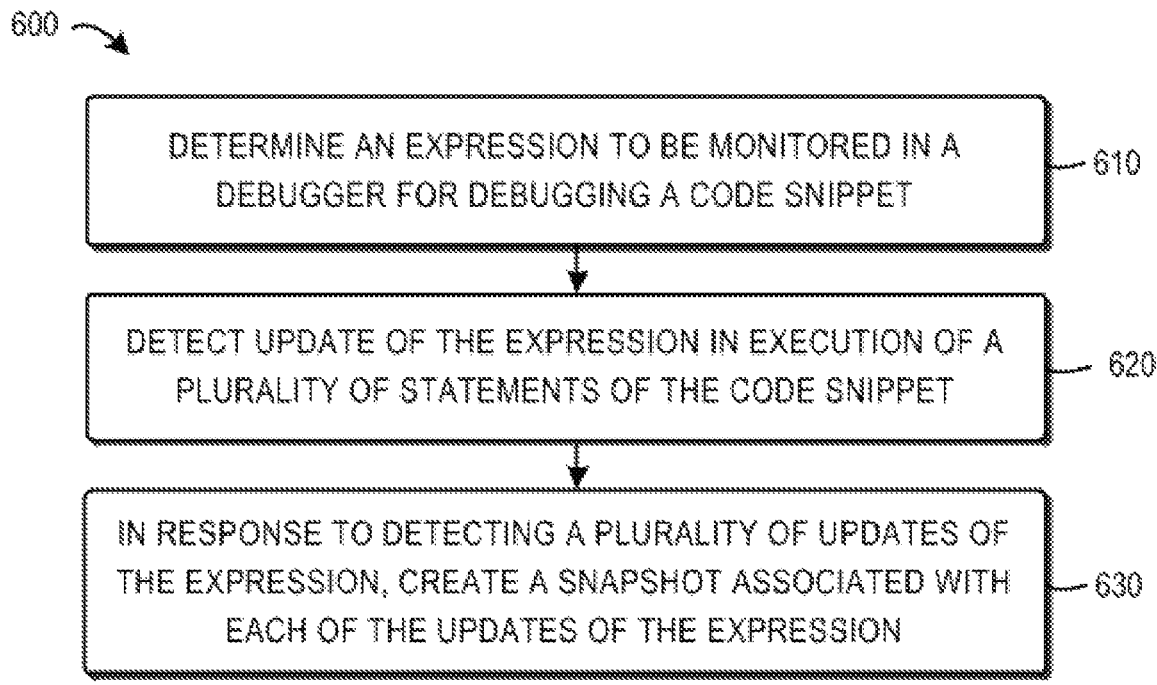
FIG. 6 is a flowchart of a process for monitoring updates of an expression in accordance with embodiments of the present invention.

FIG. 6 shows a flowchart of a method 600 for monitoring updates of an expression in accordance with embodiments of the present invention. As shown, the method 600 is entered in step 610, where an expression to be monitored is determined in a debugger for debugging a code snippet. The code snippet may be specified by the user as discussed above with reference to FIG. 2. In general, the expression to be monitored is associated with the variable that is determined as to be monitored in the code snippet. In one embodiment, the expression may include the target variable itself. For example, if the variable "user" 333 in the code snippet 310 of FIG. 3 is the target variable, then the expression 530 of FIG. 5 which involves the variable "user" 333 may be determined as the expression to be monitored. In another embodiment, the variable to be monitored may be related to a function that is included in an expression. In this case, this expression may also be determined from the debugger. As an example, if the function "DriverManager.getDrivers( )" defined in the expression 540 has some statements involved operations on the variable "FLAG_QUERY" 335 in the code snippet 310, then the expression 540 may also be determined as the target expression.

In some embodiments, all expressions included in the debugger may be automatically recognized. Then the expression that is associated with the variable to be monitored may be determined from the identified expressions. In some other embodiments, all the identified expressions may be presented to the user. The user may then select the expression to be monitored from among the identified expressions. Alternatively, all the identified expressions may be monitored in some examples.

Updates of an expression are monitored in steps 620 and 630. Particularly, in step 620, update of the expression in execution of the plurality of statements of the code snippet is detected. As mentioned above, execution of one or more statements may modify the values or memory addresses of the variables included in the code snippet. In this case, if an expression includes one or more of the updated variables, or includes one or more functions that are related to the updated variables, the value and/or memory address of this expression may probably change. Upon detecting a change of the value or the memory address of the expression, it is determined that the expression is updated. The update of the expression can be detected in a similar way for detecting the update of the variable as discussed above and will be not repeated here.

Next, in step 630 of the method 600, in response to detecting a plurality of updates of the expression, a snapshot associated with each of the updates of the expression is created. That is, if it is detected in step 620 that the expression is given a new value, and/or the value of the expression is directed to a new memory address in execution of a statement of the code snippet, a new snapshot is created for the update of the expression. In this way, after execution of the statements of the code snippet, if a plurality of updates of the expression are detected, multiple snapshots are created for the respective updates.

Similar to the snapshot for the variable, the snapshot for the expression may include a current value of the expression and a memory address for the value of the expression. In some embodiments, the snapshot may further include context of the expression. In one embodiment, the context of the expression includes a timestamp indicating when the update of the expression is detected. The timestamp may be used to identify the order of the corresponding snapshot among multiple snapshots recorded for the same expression. Alternatively, or in addition, conditions of the computing environment in which the code debugging is performed may be collected and included in the context of the expression. In some embodiments, the resulting snapshots may be presented to the programmer, for example, in the time sequence. This allows the programmer to check the flow of continuous changes in the expression.

Figure 7:
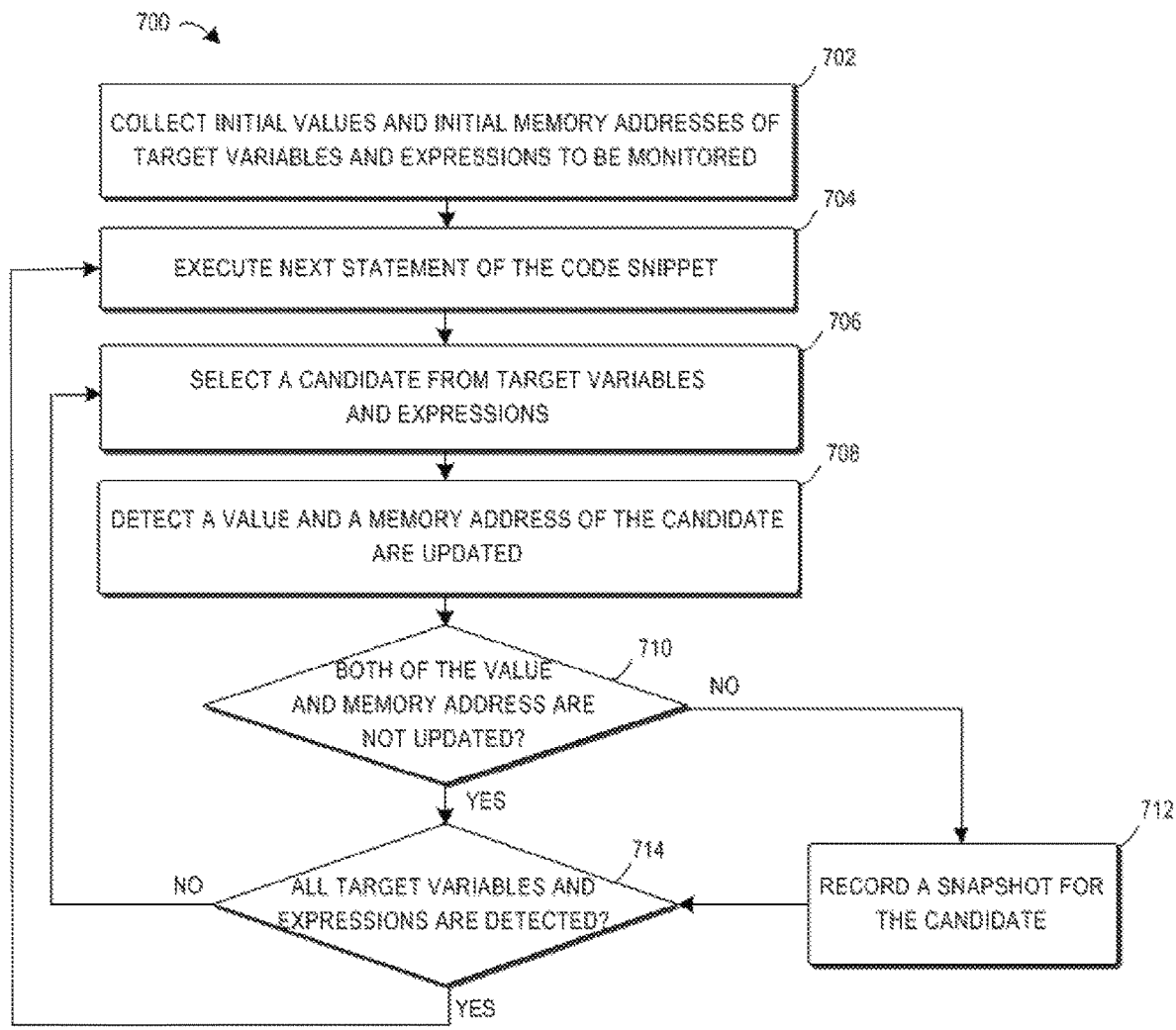
FIG. 7 is a flowchart of a method for monitoring updates of variables and expressions in accordance with embodiments of the present invention.

FIG. 7 shows the flowchart of a process 700 for monitoring updates of variables and expressions. In the example shown in FIG. 7, multiple target variables included in a code snippet under debug and target expressions written in a debugger for debugging the code snippet are selected to be monitored. The process 700 is entered in step 702, where the initial values and initial memory addresses of the target variables and expressions are collected before executing the code snippet. Then the debugging of the code snippet begins and each of the statements of the code snippet may be executed by a debugger. In step 704, a statement of the code snippet is executed. At the very beginning, the first statement is executed.

In the execution of the current statement, one or more of the target variables and expressions may be updated. In order to detect the update of each of the target variables and expressions, one candidate may be selected from the variables and expressions in step 706. The process 700 then proceeds to step 708 to detect whether a value of the candidate and a memory address for the value of the candidate are updated. The current value and memory address of the candidate are compared with the initial value and memory address collected in step 702 if no snapshot is created previously. In cases where one or more snapshots have been created for the candidate in response to previous updates, the current value and memory address are compared with the value and memory address recorded in the latest one of the created snapshots.

Based on the detection result of step 708, step 710 of process 700 determines if both the value of the candidate and the memory address for the value of the candidate are not updated. If any one of the value and the memory address is updated (NO in step 710), a snapshot is created for the candidate in step 712. In cases where both the value and the memory address are not updated (YES in step 710), the process 700 proceeds to step 714 to determine whether all the target variables and expressions are detected. If not, the process 700 returns to step 706 to continue detecting updates of the remaining target variables and expressions. If detections of all the target variables and expressions are performed, the process 700 returns to step 704 to execute the next statement of the code snippet until all the statements included in the code snippet are executed.

Figure 8:
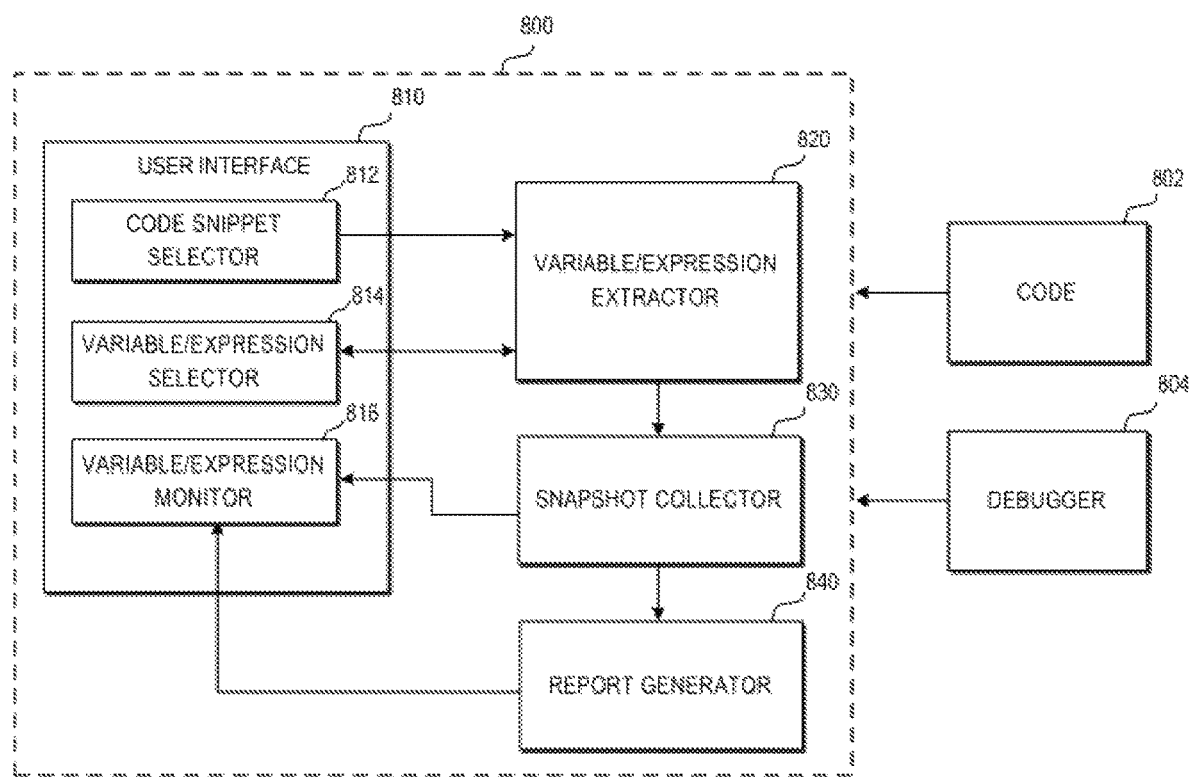
FIG. 8 is a block diagram of a system for monitoring updates of variables and expressions in accordance with embodiments of the present invention.

FIG. 8 shows a block diagram of a system 800 for monitoring updates of variables and expressions in accordance with embodiments of the present invention. As shown in FIG. 8, code 802 (to be debugged) is input to the system 800. A debugger 804 suitable for debugging the code 802 is connected to the system 800. The system 800 includes a user interface 810 having a code snippet selector 812, a variable/expression selector 814, and a variable/expression monitor 816. The user interface 810 allows a user to specify monitor points, variables and/or expressions to be monitored. The user interface 810 is also used to present the debugging results to the user. The code snippet selector 812 in the user interface 810 is configured to present the code 802 for the user and receive user selection of monitor points in the code. The code snippet selector 812 may allow the user to set more than two monitor points in some embodiments to specify multiple code snippets to be debugged. Information of the monitor points may be transmitted to the variable/expression extractor 820. The information of the monitor points may include code line numbers, function names, class names, and other information used to identify the monitor points from the code 802.

The variable/expression extractor 820 is configured to parse a code snippet of the code 802 between the specified two monitor points so as to collect variables included in the code snippet. The variable/expression extractor 820 is also configured to parse the debugger 804 so as to collect expressions defined in the debugger 804. The collected variables and expressions may be provided by the variable/expression extractor 820 to the variable/expression selector 814 for display. The user may select one or more variables and expressions to be monitored from the displayed variables and expressions. The selected variables and expressions are communicated back to the variable/expression extractor 820.

The system 800 also includes a snapshot collector 830 configured to monitor the variables and expressions and record snapshots for the variables and expressions by executing the code snippet. The snapshot collector 830 obtains the variables and expressions to be monitored from the variable/expression extractor 820. In some embodiments, in order to identify a variable from the code 802, some information such as the name of the variable, the position of declaration of the variable, and the like may also be received from the variable/expression extractor 820. The snapshot collector 830 may execute the code snippet of the code 802 using the debugger 804. The snapshot collector 830 may also monitor updates of the variables and expressions to be monitored so as to create snapshots for those variables and expressions. The monitoring process 800 illustrated with reference to FIG. 6 may be performed in the snapshot collector 830.

Figure 9:
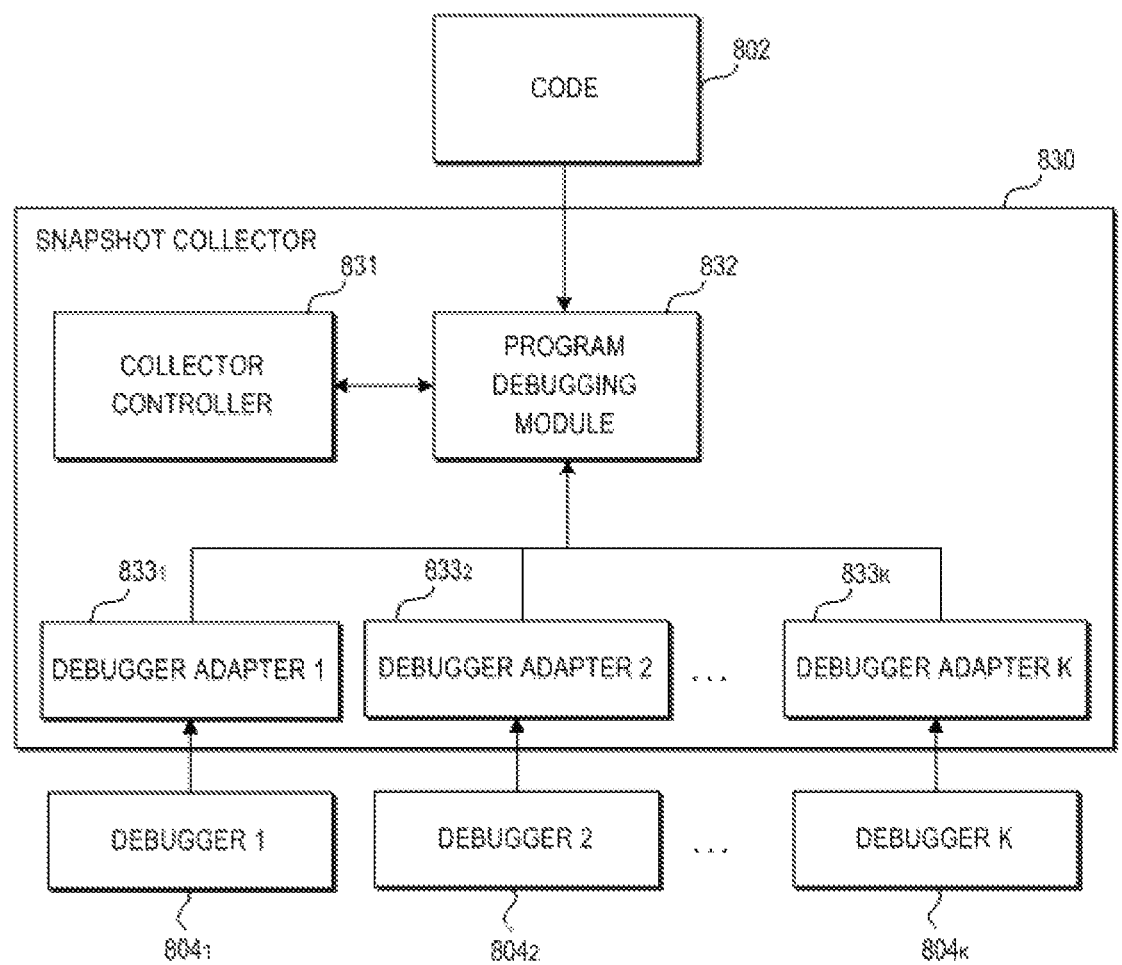
FIG. 9 is a block diagram illustrating an example of a snapshot collector included in the system as shown in FIG. 8 in accordance with embodiments of the present invention.

An example structure of the snapshot collector 830 is shown in FIG. 9. The snapshot collector 830 includes a collector controller 831 configured to control the operations of the snapshot collector 830. The snapshot collector 830 also includes a code debugging module 832 configured to execute the code snippet of the code 802 so as to monitor updates of the variables and expressions. In order to facilitate execution of code snippets written in different programming languages, the debugger 804 may include debuggers $804_1$, $804_2$ . . . $804_K$ that are suitable for debugging code snippets written in K different programming languages. The snapshot collector 830 may include multiple debugger adapters $833_1$, $833_2$ . . . $833_K$. Each of the debugger adapters $833_1$ to $833_K$ is configured to adapt one of debuggers $804_1$ to $804_K$ to the code debugging module 832. The collector controller 831 may control which of the debuggers $804_1$ to $804_K$ can be utilized based on the programming language of the input code 802.

Referring back to FIG. 8, during operation of the snapshot collector 830, each time a snapshot for a variable or an expression is created, the snapshot collector 830 may provide the created snapshot for the variable/expression monitor 816 included in the user interface 810. The variable/expression monitor 816 may display the snapshot obtained from the snapshot collector 830 so that the updates of the variables and expressions can be observed by the user in time.

Figure 10:
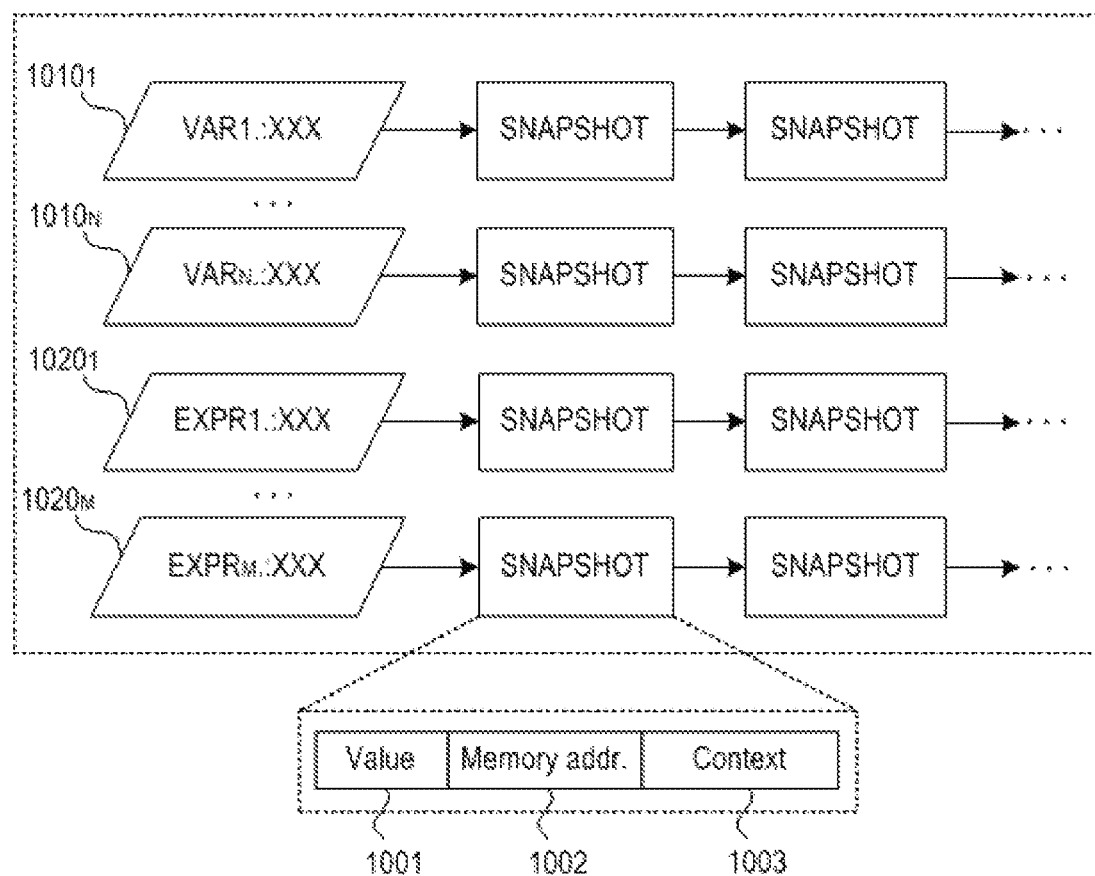
FIG. 10 is a schematic diagram illustrating presentation of snapshot flows for variables and expressions in accordance with embodiments of the present invention.

The system 800 also includes a report generator 840. After the snapshot collector 830 finishes the monitoring process, all the snapshots for the variables and expressions collected by the snapshot collector 830 may be transmitted to the report generator 840. The report generator 840 arranges the recorded snapshots for each of the variables and expressions and then generates a report that can assist the user to analyze the debugging result of the code snippet. The report generator 840 may arrange the snapshots recorded for a variable or expression in a sequence based on the timestamps included in the respective snapshots. As shown in FIG. 10, each of the variables VAR1 to $VAR_N$ has a snapshot list $1010_1$ . . . $1010_N$. The snapshots are arranged in a time order based on when the snapshots are created. Each of the expressions EXPR1 to $EXPR_M$ has also an associated snapshot list $1020_1$ . . . $1020_M$. A snapshot for a variable or expression may include the value of the variable or expression 1001, the memory address for the value 1002, and context information 1003. In some other embodiments, the report generator 840 may alternatively or additionally generate a diagram or a curve to represent a change flow for a variable or an expression, such as a change flow in the value or memory address of the variable or the expression. The generated report of the snapshots is provided to the variable/expression monitor 816 to be displayed for the user.

In cases where multiple code snippets are specified by the user, for each of the code snippets, the system 800 may operate to generate snapshots for variables to be monitored in the code snippet and for expressions to be monitored in the debugger 804. Corresponding snapshots may be created and displayed to the user respectively so as to allow the user to analyze whether the respective code snippets are executed as expected.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   one or more processors;
   a memory coupled to at least one of the one or more processors; and
   a set of computer program instructions stored in the memory, with the set of computer program instructions including instructions programmed to cause the one or more processors to perform the following actions:
   receiving a set of target code including a code snippet specified by a developer,
   parsing, by machine logic, the code snippet to determine a raw set of variable(s) and/or expression(s) that are present in the code snippet,
   receiving, by machine logic, user input indicative of a selected set of variable(s) and/or expression(s) from the raw set of variable(s) and/or expression(s),
   executing the set of target code for debugging purposes,
   during execution of the set of target code, monitoring, by machine logic, the selected set of variable(s) and/or expressions(s) to detect to a set of memory location updates made to the set of variable(s) and/or expression(s), with each memory location update reflecting a change in memory location where a variable or expression is stored without a change in the value of the variable or expression, during execution of the set of target code and for each detected given memory location update of a given selected variable and/or expression of the set of variable(s) and/or expression(s), creating a contemporaneous snapshot with each snapshot including: (i) a memory address of the given selected variable and/or expression, and (ii) context data indicative of environment/condition related information at the time of the detected given memory location update, with the context data including: (a) a relationship of function calls related to the set of variable(s) and/or expression(s), and (b) a timestamp including information indicative of a creation time for the contemporaneous snapshot, and generating a memory change snapshot sequence report, with the memory change snapshot sequence report including, for each given selected variable and/or expression, a sequence of contemporaneous snapshots corresponding to detected given memory location updates, with the sequence of the contemporaneous snapshots based on the timestamps corresponding to the contemporaneous snapshots that correspond to a given selected variable and/or expression.

2. The system of claim 1, wherein the memory change snapshot sequence report further includes:
for each given selected variable and/or expression, a diagram representative of a change flow for the memory address of the given selected variable and/or expression throughout the sequence of contemporaneous snapshots.

3. The system of claim 1, wherein each created snapshot further includes a timestamp indicating when the snapshot was created.

4. The system of claim 1 wherein each created snapshot further includes a statement containing a declaration of the memory location of the updated variable or expression.

5. The system of claim 1, wherein each created snapshot further includes an identity of a statement in the code snippet that caused the memory location update corresponding to the snapshot.

6. The system of claim 1, wherein each created snapshot further includes a stack status of the variable or expression subject to the memory location update corresponding to the snapshot.

7. A computer program product comprising:
a memory coupled to at least one of one or more processors; and
a set of computer program instructions stored in the memory, with the set of computer program instructions including instructions programmed to cause the one or more processors to perform the following actions:
receiving a set of target code including a code snippet specified by a developer,
parsing, by machine logic, the code snippet to determine a raw set of variable(s) and/or expression(s) that are present in the code snippet,
receiving, by machine logic, user input indicative of a selected set of variable(s) and/or expression(s) from the raw set of variable(s) and/or expression(s),
executing the set of target code for debugging purposes,
during execution of the set of target code, monitoring, by machine logic, the selected set of variable(s) and/or expressions(s) to detect to a set of memory location updates made to the set of variable(s) and/or expression(s), with each memory location update reflecting a change in memory location where a variable or expression is stored without a change in the value of the variable or expression, during execution of the set of target code and for each detected given memory location update of a given selected variable and/or expression of the set of variable(s) and/or expression(s), creating a contemporaneous snapshot with each snapshot including: (i) a memory address of the given selected variable and/or expression, and (ii) context data indicative of environment/condition related information at the time of the detected given memory location update, with the context data including: (a) a relationship of function calls related to the set of variable(s) and/or expression(s), and (b) a timestamp including information indicative of a creation time for the contemporaneous snapshot, and generating a memory change snapshot sequence report, with the memory change snapshot sequence report including, for each given selected variable and/or expression, a sequence of contemporaneous snapshots corresponding to detected given memory location updates, with the sequence of the contemporaneous snapshots based on the timestamps corresponding to the contemporaneous snapshots that correspond to a given selected variable and/or expression.

8. The computer program product of claim 7, wherein the memory change snapshot sequence report further includes:
for each given selected variable and/or expression, a diagram representative of a change flow for the memory address of the given selected variable and/or expression throughout the sequence of contemporaneous snapshots.

9. The computer program product of claim 7, wherein each created snapshot further includes a timestamp indicating when the snapshot was created.

10. The computer program product of claim 7 wherein each created snapshot further includes a statement containing a declaration of the memory location of the updated variable or expression.

11. The computer program product of claim 7, wherein each created snapshot further includes an identity of a statement in the code snippet that caused the memory location update corresponding to the snapshot.

12. The computer program product of claim 7, wherein each created snapshot further includes a stack status of the variable or expression subject to the memory location update corresponding to the snapshot.

13. The system of claim 1 wherein the set of computer program instructions further include instructions for causing the one or more processors to perform the following actions:
determining a programming language of the code snippet; and
selecting a debugger from a plurality of debuggers based, at least in part on the determined programming language.

14. The system of claim 13 wherein the execution of the set of target code is performed by the selected debugger.

15. The computer program product of claim 7 wherein the set of computer program instructions further include instructions for causing the one or more processors to perform the following actions:
determining a programming language of the code snippet; and selecting a debugger from a plurality of debuggers based, at least in part on the determined programming language.

16. The computer program product of claim 15 wherein the execution of the set of target code is performed by the selected debugger.

* * * * *